(12) United States Patent
Kim et al.

(10) Patent No.: US 7,761,813 B2
(45) Date of Patent: *Jul. 20, 2010

(54) THREE-DIMENSIONAL MOTION GRAPHIC USER INTERFACE AND METHOD AND APPARATUS FOR PROVIDING THE SAME

(75) Inventors: Sung-woo Kim, Seoul (KR); Joo-kyung Woo, Seoul (KR); Joon-ho Ok, Seoul (KR); Jung-bong Lee, Seoul (KR); Hyun-joo Kang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1171 days.

This patent is subject to a terminal disclaimer.

(21) Appl. No.: 11/187,920

(22) Filed: Jul. 25, 2005

(65) Prior Publication Data

US 2006/0020898 A1 Jan. 26, 2006

(30) Foreign Application Priority Data

Jul. 24, 2004 (KR) ...................... 10-2004-0058073

(51) Int. Cl.
G06F 3/00 (2006.01)
G06F 15/00 (2006.01)
(52) U.S. Cl. ...................................... 715/836; 715/839
(58) Field of Classification Search ................ 715/782, 715/848, 853, 855, 763–765, 836, 851, 839, 715/976; 345/419, 415, 440, 349
See application file for complete search history.

(56) References Cited

U.S. PATENT DOCUMENTS

| 5,303,388 | A | * | 4/1994 | Kreitman et al. | ............ 715/836 |
| 5,515,486 | A | | 5/1996 | Amro et al. | |
| 5,602,564 | A | * | 2/1997 | Iwamura et al. | ............. 715/782 |
| 5,678,015 | A | * | 10/1997 | Goh | .......................... 715/782 |
| 6,157,383 | A | | 12/2000 | Loop | |
| 6,259,458 | B1 | * | 7/2001 | Theisen et al. | .............. 345/440 |
| 6,344,863 | B1 | | 2/2002 | Capelli et al. | |
| 6,363,404 | B1 | | 3/2002 | Dalal et al. | |
| 6,597,358 | B2 | * | 7/2003 | Miller | ........................ 345/427 |
| 6,621,509 | B1 | | 9/2003 | Eiref et al. | |
| 6,909,443 | B1 | * | 6/2005 | Robertson et al. | ........... 715/782 |
| 2003/0001898 | A1 | | 1/2003 | Bernhardson | |

* cited by examiner

Primary Examiner—Cao "Kevin" Nguyen
(74) Attorney, Agent, or Firm—Sughrue Mion, PLLC

(57) ABSTRACT

A three-dimensional motion graphic user interface (MGUI) and a method and apparatus for providing the same. The MGUI includes a three-dimensional interface space which has an active space and an inactive space, and a polyhedron component which is three-dimensionally presented in the active space, wherein at least one of a plurality of faces that are subject to the polyhedron component has predetermined attributes, and information displayed on the faces is displayed differently according to the attributes and a presentation relationship between the active space and the polyhedron component.

20 Claims, 14 Drawing Sheets

THREE-DIMENSIONAL MOTION GRAPHIC USER INTERFACE AND METHOD AND APPARATUS FOR PROVIDING THE SAME

CROSS-REFERENCE TO RELATED APPLICATION

This application claims priority from Korean Patent Application No. 10-2004-0058073 filed on Jul. 24, 2004 in the Korean Intellectual Property Office, the disclosure of which is incorporated herein by reference in its entirety.

BACKGROUND OF THE INVENTION

1. Field of the Invention

The present invention relates to a three-dimensional motion graphic user interface (MGUI) and a method and apparatus for providing information using the same, and more particularly, to a method and apparatus for providing information, in which visual effects and information use efficiency are improved by providing information to a three-dimensional user interface that changes dynamically according to a user's actions.

2. Description of the Related Art

User interfaces (UI) of conventional digital devices use graphic user interface (GUI) components of personal computer (PC) operating systems. As a result, most UIs have been two-dimensional, and even in the case of three-dimensional UIs, most of them are static and have features that are similar to those of conventional two-dimensional UIs.

FIG. 1 illustrates a UI using a GUI component supported in a conventional PC operating system.

Conventional UIs are two-dimensional and static. As a result, information displayed by UIs usually takes the form of text and is insufficient to satisfy user's emotions. Thus, the effectiveness with which visual information can be provided is limited. Although three-dimensional components exist among components provided by conventional GUIs, they still fall into the two-dimensional concept, and although they are viewed as three-dimensional, their advantages as three-dimensional structures are not fully utilized in their application. GUIs of PC operating systems are not suitable for all digital devices. Also, in particular, in the case of devices that provide multimedia contents, conventional UIs are limited in the extent to which they can satisfy a user's emotions and provide entertainment functions. To solve the foregoing problems, various inventions (e.g., U.S. Pat. No. 6,344,863, entitled "Three-Dimensional GUI Windows with Variable-Speed Perspective Movement") have been suggested, but the problems still remain unsolved. Therefore, there is a need for a dynamic and realistic UI for digital devices that provide a variety of contents.

SUMMARY OF THE INVENTION

The present invention provides a method and apparatus for providing information that is intuitive and satisfies a user's emotions by providing a UI that uses a three-dimensional component.

The present invention also reduces an error in a user's recognition by providing a natural information flow in a three-dimensional GUI environment.

The present invention also allows a user to view and control information from various angles, thereby enabling the user to understand information more clearly.

The present invention also makes it possible to display more information than conventional UIs by displaying information on faces of a polyhedron component.

The above stated objects as well as other objects, features and advantages, of the present invention will become clear to those skilled in the art upon review of the following description.

According to an aspect of the present invention, there is provided a three-dimensional motion graphic user interface (MGUI) comprising a three-dimensional interface space and a polyhedron component. The three-dimensional interface space has an active space and an inactive space and the polyhedron component is three-dimensionally presented in the active space. At least one of a plurality of faces that are subject to the polyhedron component has predetermined attributes, and information displayed on the faces is displayed differently according to the attributes and a presentation relationship between the active space and the polyhedron component.

According to another aspect of the present invention, there is provided an apparatus for providing a three-dimensional motion graphic user interface (MGUI), the apparatus comprising, a control module which creates a three-dimensional interface space having an active space and an inactive space and creates a polyhedron component that is three-dimensionally presented in the active space, a storing module which stores the three-dimensional interface space and the polyhedron component created by the control module, an input module to which data about a user's action with respect to the three-dimensional interface space or the polyhedron component is input, a user interface module which assigns predetermined attributes to at least one of a plurality of faces subject to the polyhedron component, maps information displayed on an information face according to the predetermined attributes, processes motion of the polyhedron component according to data about the user's action input through the input module, changes an information display according to motion of the polyhedron component, and manages at least one group of a plurality of polyhedron components, and an output module which displays a processing result of the user interface module.

According to still another aspect of the present invention, there is provided a method for providing a three-dimensional motion graphic user interface (MGUI), the method including a user accessing a polyhedron component that is three-dimensionally presented in an active space in a three-dimensional interface space having the active space and an inactive space, the user inputting an action that generates motion of the polyhedron component, and motion of the polyhedron component being generated according to the action.

According to a further aspect of the present invention, there is provided a method for providing a three-dimensional motion graphic user interface (MGUI), the method including selecting a specific polyhedron component from a group of polyhedron components that are three-dimensionally presented in an active space in a three-dimensional interface space having the active space and an inactive space, emphasizing the selected polyhedron component, displaying detail information of information displayed on an information face of the selected polyhedron component, and changing a way of displaying the other polyhedron components of the group of polyhedron components.

BRIEF DESCRIPTION OF THE DRAWINGS

The above and other features and advantages of the present invention will become more apparent by describing in detail exemplary embodiments thereof with reference to the attached drawings in which.

Figure 1:
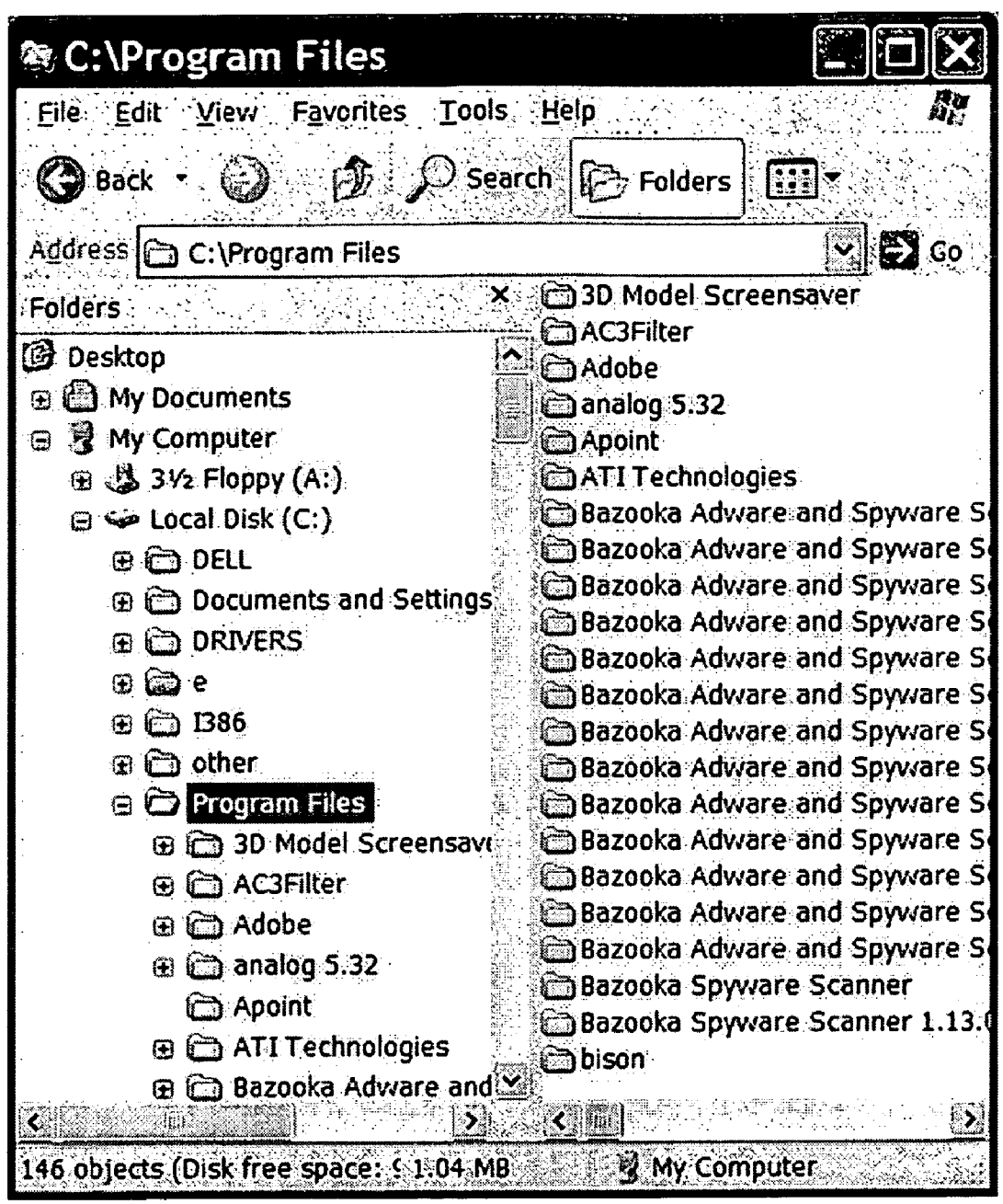
FIG. 1 illustrates a UI using a GUI component supported in a conventional PC operating system.

DETAILED DESCRIPTION OF THE ILLUSTRATIVE-NON-LIMITING EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described in detail with reference to the accompanying drawings.

Figure 2:
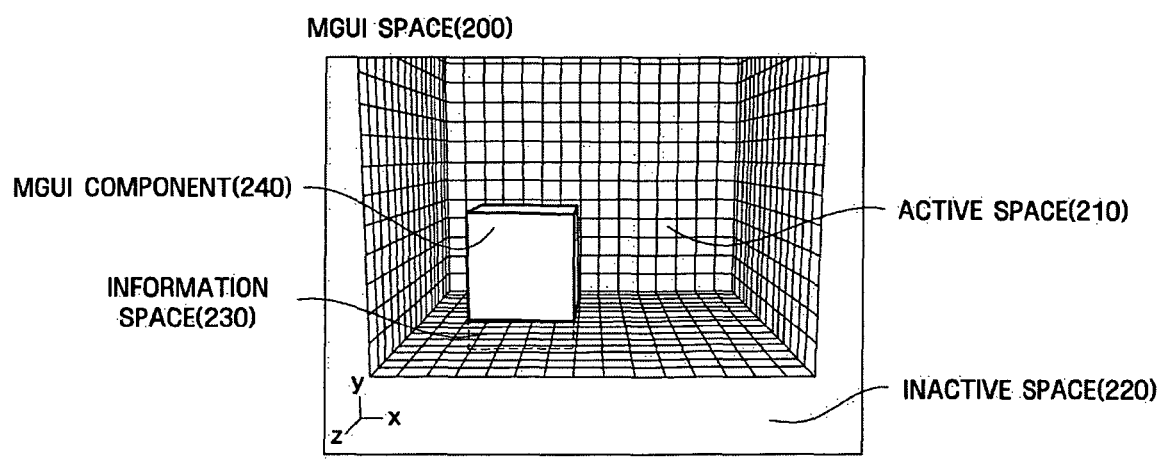
FIG. 2 illustrates the entire configuration of an MGUI according to an exemplary embodiment of the present invention.

FIG. 2 illustrates the overall configuration of a MGUI according to an exemplary embodiment of the present invention. An MGUI is a UI capable of establishing a more dynamic GUI environment through a three-dimensional environment and motion graphics. An MGUI environment includes the following:

1. MGUI space
2. MGUI component
3. MGUI component presentation
4. MGUI camera view
5. MGUI information face and information space An MGUI space 200 is a space for establishing the MGUI environment and is divided into an active space 210 and an inactive space 220 according to the characteristic of a space. The active space 210 can be used when a UI is designed. To present an MGUI component 240 provided in the MGUI in the active space 210, an area for an information space 230 should be designated within the active space 210. In other words, the information space 230 is an area where the MGUI component 240 can be actually placed within the active space 210. Also, the information space 230 is an area secured for smooth manipulation of information and space management.

The MGUI component 240 means a configuration object of the MGUI that provides information to a user while the user is interacting with it in the MGUI environment. The MGUI component 240 includes at least one information face. The MGUI component 240, and elements of the MGUI component 240, the information face, and the information space 230 will be described in detail later with reference to FIG. 3.

Presentation of the MGUI component 240 involves determining a way to manipulate a group of at least one component in the information space 230, motion generated during the manipulation, and how to present the component on a screen. Presentation of the MGUI component 240 will be described in detail later with reference to FIGS. 13 through 19.

The MGUI camera view means a viewpoint in the MGUI environment. Viewpoint movement means navigation in the MGUI space 200 and motion is generated in the entire MGUI space 200. The MGUI camera view is the main cause of motion in the MGUI environment, along with inherent motion attributes of the MGUI component 240, which will be described in detail later with reference to FIG. 12A.

Figure 3:
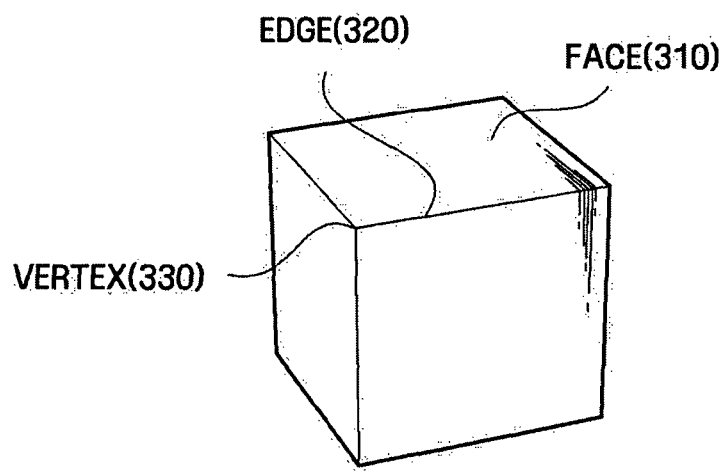
FIG. 3 illustrates an exemplary embodiment of a polyhedron component included in the MGUI.

FIG. 3 illustrates an exemplary embodiment of a polyhedron component included in the MGUI.

The polyhedron component includes a plurality of faces 310, edges 320, and vertexes 330. A polyhedron is a three-dimensional figure having at least four faces, examples of which include a tetrahedron, a pentahedron, and a hexahedron. A sphere may be assumed to be an example of a polyhedron formed of numerous faces. Here, to facilitate explanation of the present invention, a hexahedron will be taken as an example of a polyhedron.

The polyhedron component has the following attributes: an identifier and a size as attributes of a polyhedron; a number, a color, transparency, and information on whether a corresponding face is an information face as attributes of a face; and an edge color as an attribute of an edge. Here, the information face means a face on which information can be displayed among a plurality of faces forming the polyhedron component. The information face will be described in detail later with reference to FIGS. 5A and 5B.

Figure 4A:
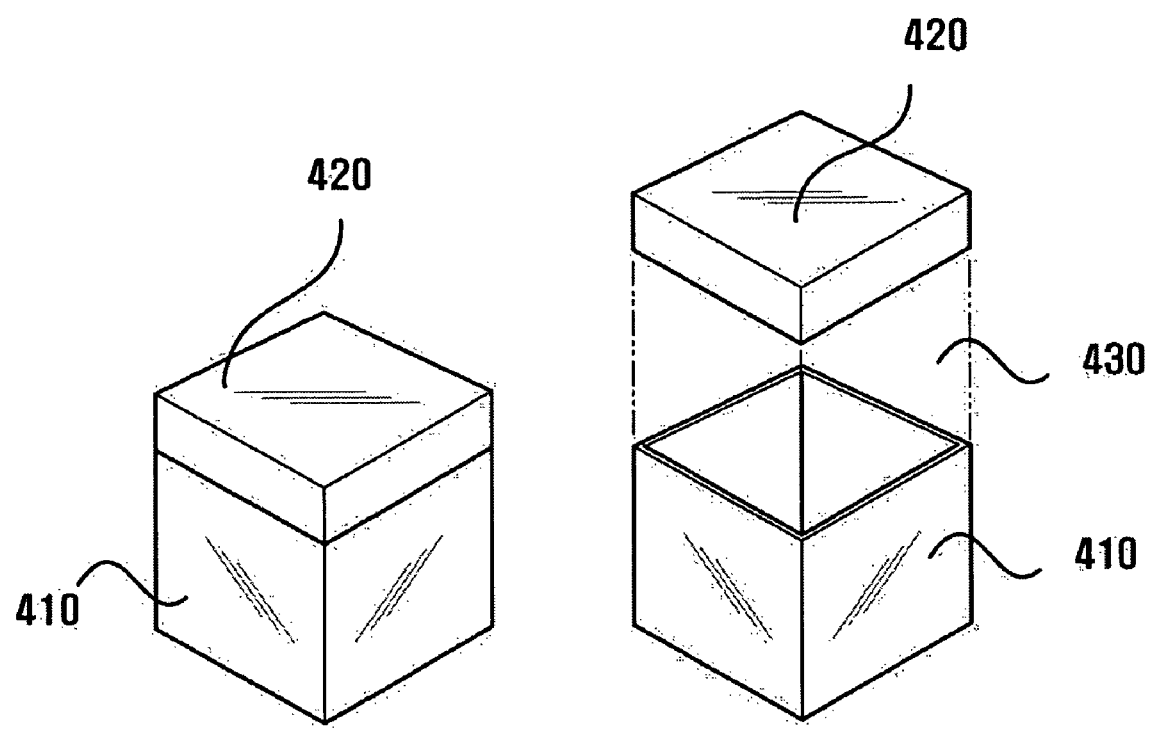
FIGS. 4A and 4B illustrate a polyhedron component having a cover and including other objects in its internal space.
Figure 4B:
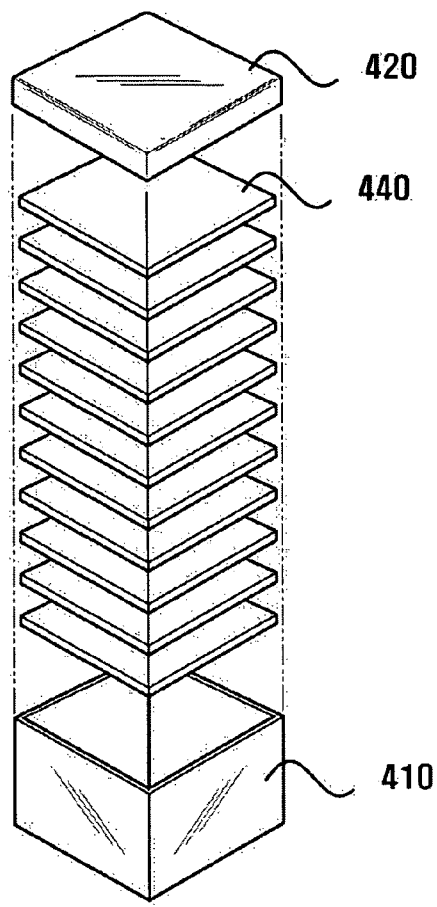

FIGS. 4A and 4B illustrate a polyhedron component having a cover and including other objects in its internal space. As shown in FIGS. 4A and 4B, the polyhedron component has at least one cover 420 that can be entirely separated from a main body 410. The polyhedron component may have a plurality of covers that can be opened at the same time.

The polyhedron component having the cover 420 can contain objects 440 that display information in its internal space 436 between the cover 420 and the main body 410. Presentation and manipulation of the objects 440 contained in the internal space 430 depend on attributes assigned to the objects 440. Information objects in the internal space 430 may automatically pop outside after the cover 420 is opened or remain in the internal space 430 even after the cover 420 is opened and then be pulled out by a user's action. In an exemplary embodiment of the present invention, the amount of displayed information objects may change according to the height to which a cover is opened. There is no limit on the number of objects that can be contained in the internal space 430. However, in an exemplary embodiment of the present invention, as the size of the polyhedron component having a cover becomes larger, it can contain more objects than a small sized one.

Each face of the main body 410 and each face of the cover 420 may have attributes of an information face. Objects contained in the internal space 430 may be differentiated according to a face on which a focus is placed among faces forming the main body 410 and faces forming the cover 420. Even objects displaying the same information may have different display forms. The corresponding application will be described later with reference to FIG. 21.

The polyhedron having a cover has the following attributes, along with the foregoing general attributes of the polyhedron component. In other words, the polyhedron having a cover has information on whether a corresponding face is subject to a cover, the size of the cover, information about objects that are contained in the internal space and assigned to each face in the internal space, and information about presentation and manipulation of objects in the internal space.

Figure 5A:
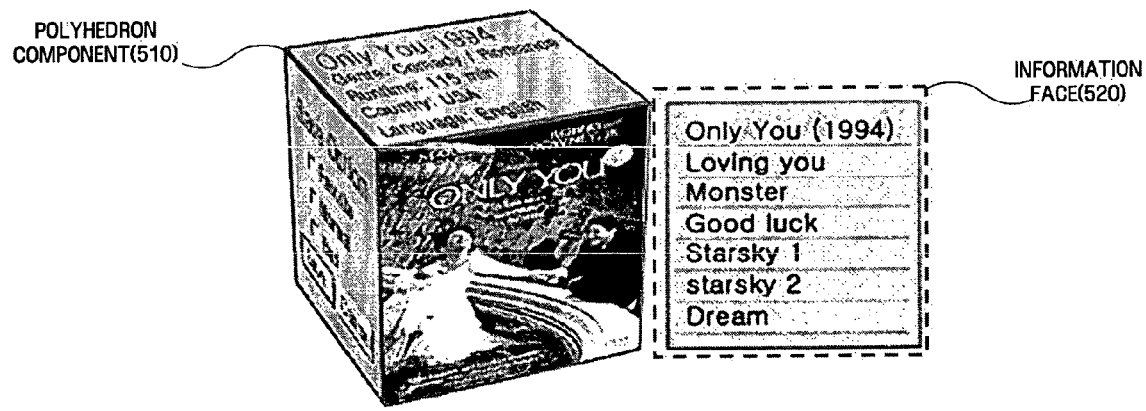
FIG. 5A illustrates an exemplary embodiment in which information is mapped onto faces of the polyhedron component.
Figure 5B:
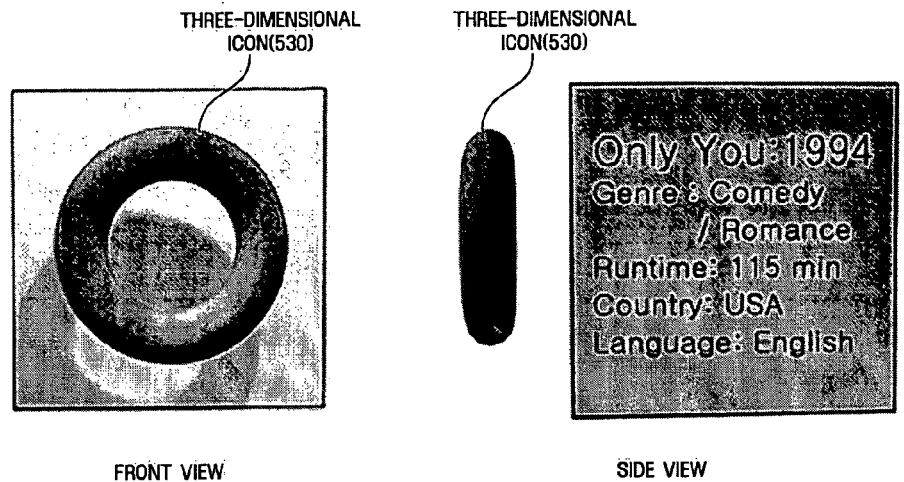
FIG. 5B illustrates a case where information mapped onto a face of the polyhedron component is three-dimensional information.

FIGS. 5A and 5B illustrate an exemplary embodiment in which information is mapped onto information faces.

An information face of an MGUI corresponds to a window of a conventional GUI. In the MGUI, the information face is subject to the MGUI component and such subjection to the MGUI component can be made in the following two manners. First, the information face can exist as a face. Second, the information face can exist as a visualized form (e.g., the information face 520 of FIG. 5A) separated from the polyhedron. In other words, subjection of the information face to the MGUI component means that the information face operates in connection with the MGUI component and displays information, regardless of whether the information face forms the polyhedron component of the MGUI or takes another form separated from faces forming the polyhedron component.

FIGS. 5A and 5B show a polyhedron component 510 of the MGUI that takes the form of a hexahedron having six faces, each of which has attributes of an information face and displays information. A square next to the polyhedron (hexahedron) component 510 is an information face 520 visualized on a screen, like a single component. In this case, the information face is displayed on a screen as a two-dimensional plane having no depth like a window of a conventional GUI. When information displayed by the polyhedron (hexahedron) component 510 changes or the polyhedron (hexahedron) component 510 operates, information changes and operates accordingly.

Texts, images, moving images, and two-dimensional widgets that are two-dimensional visual information can be displayed on the information face 520. Three-dimensional information such as three-dimensional icons can also be displayed on the information face 520. In this case, three-dimensional information (a three-dimensional icon) 530 can be regarded as being attached onto the information face 520.

Information displayed by a polyhedron component is not limited to the number of faces forming the polyhedron component, but instead the polyhedron component can display more information than the number of faces of the polyhedron component. In an exemplary embodiment, an indicator indicating the number of remaining information may be used.

If the information face is defined according to attributes of the MGUI component, the form in which information is displayed on the information face may vary with attributes assigned to the polyhedron component. For example, the size of or amount of information displayed on the information face may change according to the size of the polyhedron component in which the information face is defined or the size of the information face.

Figure 6A:
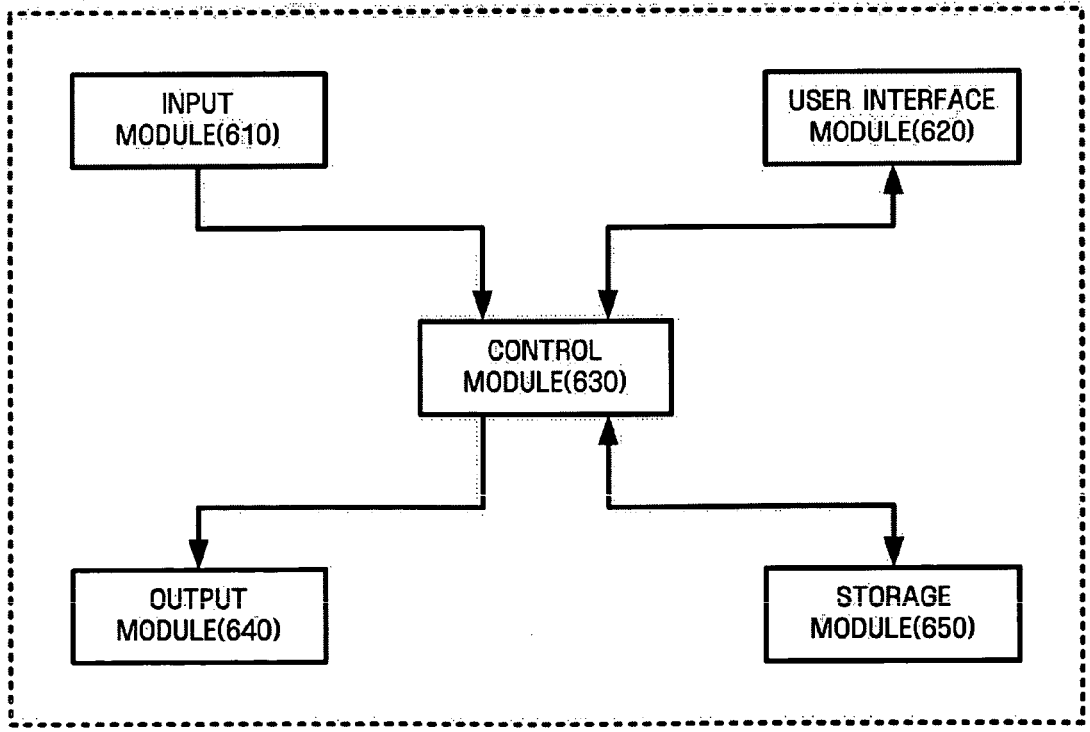
FIG. 6A is a block diagram of an apparatus for providing a three-dimensional MGUI according to an exemplary embodiment of the present invention.

FIG. 6A is a block diagram of an apparatus for providing a three-dimensional MGUI according to an exemplary embodiment of the present invention.

The apparatus for providing a three-dimensional MGUI may be a digital device. Here, the digital device has a digital circuit that processes pager, a digital camera, a facsimile, a digital photocopier, a personal digital assistant (PDA), a mobile phone, a digital appliance, a digital telephone, a digital projector, a home server, a digital video recorder, a digital TV broadcast receiver, a digital satellite broadcast receiver, and a set-top box.

An apparatus 600 for providing a three-dimensional MGUI according to an exemplary embodiment of the present invention includes an input module 610, a user interface module 620, a control module 630, an output module 640, and a storing module 650.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The control module 630 creates an MGUI space or a polyhedron component and connects and manages different modules. The storage module 650 stores the MGUI space or the polyhedron component created by the control module 630.

Data about a user's action with respect to a polyhedron component is input to the input module 610. The user's action includes accessing a polyhedron component, selecting a specific polyhedron component, selecting a specific information face of a polyhedron component or a specific menu on an information face, and operating a polyhedron component.

The output module 640 displays data processed by the user interface module 620 using a display device.

Figure 6B:
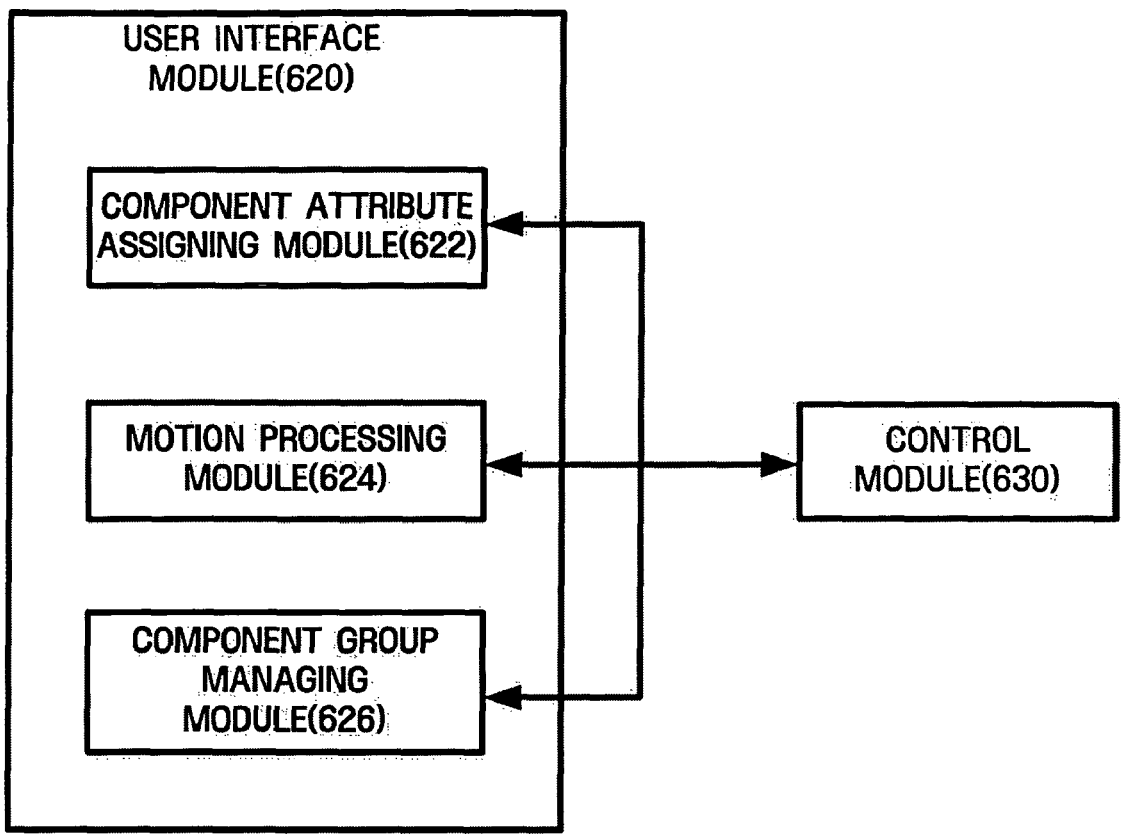
FIG. 6B is a detailed block diagram of a user interface module shown in FIG. 6A.

The user interface module 620 will be described with reference to FIG. 6B. The user interface module 620 provides a user interface using the MGUI space or the polyhedron component created by the control module 630. The user interface module 620 includes a component attribute assigning module 622, a motion processing module 624, and a component group managing module 626.

The component attribute assigning module 622 assigns the attributes described with reference to FIG. 3 or FIGS. 4A and 4B to the polyhedron component created by the control module 630 and maps information displayed on an information face of the polyhedron component according to the assigned attributes. In the case of a polyhedron component having a cover, the component attribute assigning module 622 defines attribute information about a group of information objects that are contained in the internal space of the polyhedron component having the cover.

The motion processing module 624 processes motion of a polyhedron component in an MGUI space according to the data about a user's action, which is input through the input module 610 and maps information displayed on an information face of the polyhedron component or information objects contained in the internal space of the polyhedron component having the cover through the component attribute assigning module 622 according to motion.

The component group managing module 626 receives data about a specific polyhedron selected by a user from a group of polyhedron components, highlights the selected polyhedron, and modifies information mapped onto an information face of the selected polyhedron through the component attribute assigning module 622. Also, the component group managing module 626 changes display forms of other polyhedron components that are not selected in the group. As such, the user interface module 620 includes modules that are divided according to their respective functions and data about a user interface processed by the modules undergoes the control module 630 and is displayed by the output module 640.

Figure 7:
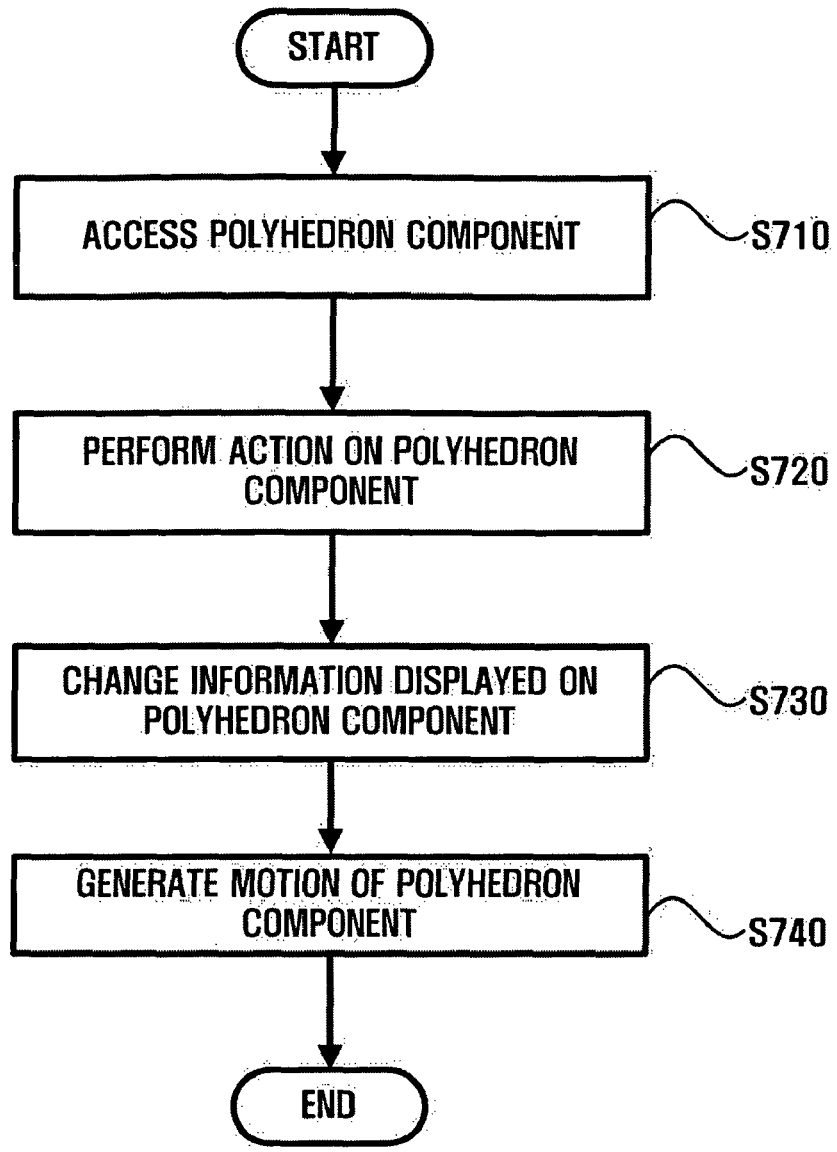
FIG. 7 is a flowchart illustrating a process of generating motion of a polyhedron component in response to a user's action.

FIG. 7 is a flowchart illustrating a process of generating motion of a polyhedron component in response to a user's action.

A polyhedron component of an MGUI is a dynamic three-dimensional UI component whose motion is generated according to a user's action. A process of generating motion is as follows. A user accesses a polyhedron component in step S710 and performs a specific action on the polyhedron component in step S720. Information displayed on information faces of the polyhedron component changes according to a user's action in step S730 and motion of the polyhedron component is generated in step S740.

In another exemplary embodiment, motion of a polyhedron component may be generated without a change in information displayed on information faces of the polyhedron component. In the case of a polyhedron component having a cover, information objects contained in the internal space of the polyhedron component may change according to motion of a main body or motion of the cover of the polyhedron component.

A user can access a polyhedron component (step S710) by accessing a specific polyhedron component that displays information of interest in an MGUI environment. Access can be made using various input devices such as a mouse, a keyboard, a keypad, or a touch pad.

The user's action (step S720) on the polyhedron component can be performed by selecting a specific menu on an information face of the polyhedron component, moving or rotating the polyhedron component, or changing the size of the polyhedron component to search for necessary information. Selection of a specific menu and movement or rotation of the polyhedron component can be performed using various input devices such as a mouse, a keyboard, a keypad, or a touch pad. For example, selection of a specific menu can be made by clicking a selection button on a keypad, and movement or rotation of the polyhedron component can be performed using an arrow button on the keypad. In another exemplary embodiment, if a polyhedron component whose motion is to be generated is specified, motion menus that can be selected by a user pop up on the screen and the user can perform an action on the polyhedron component by selecting a motion menu corresponding to the action.

The input module 610 provides data about the user's access or action to the user interface module 620 through the control module 630.

When a user performs an action on the polyhedron component, information displayed on information faces of the polyhedron component can be changed according to the user's action. In the case of a polyhedron component having a cover, information objects contained in the internal space of the polyhedron component can also be changed according to the user's action. To cause such a change, the component attribute assigning module 622 of the user interface module 620 modifies information mapped onto the information faces or information objects contained in the internal space. For example, if a user selects a specific menu on a specific information face in step S720, the component attribute assigning module 622 maps sub menus or sub information of a selected menu onto the information faces of the polyhedron component and the output module 640 displays a result of mapping. Alternatively, all faces forming the polyhedron component may be unfolded into the plane to allow the user to recognize information on the information faces with a single glance, without changing the information on the information faces according to the user's action.

Motion of the polyhedron component, generated by the user's action, may cause another motion according to the form of the user's action. Motion of the polyhedron component, generated by the user's action, is processed by the motion processing module 624 of the user interface module 620. The motion processing module 624 processes the position of the polyhedron component according to motion or data required for display and displays a result of processing through the output module 640.

Motion of the polyhedron component includes a position change, a size change, rotation, and spring lock. Here, a reference face for the motion may be a front face of the polyhedron component or a face that is opposite to the user. In another exemplary embodiment, the user may select a motion reference face using various input devices. In still another exemplary embodiment, a pointer is placed on a motion reference face and the user may select the motion reference face by moving the pointer. Each type of motion will be described with reference to FIGS. 8 through 12B.

Figure 8:
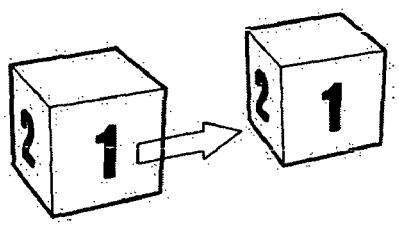
FIG. 8 illustrates an exemplary embodiment in which the position of a polyhedron component changes during motion of the polyhedron component.

FIG. 8 illustrates an exemplary embodiment in which the position of a polyhedron component is changed during motion of the polyhedron component.

After a user selects a specific polyhedron component, the user designates a corresponding position to which the selected polyhedron component is to be moved using various input devices, thereby moving the selected polyhedron component to the designated position. For example, when a mouse is used as the input device, the user selects a desired polyhedron component by clicking the polyhedron component using the mouse and drags the clicked polyhedron component to a desired position.

Figure 9:
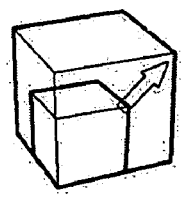
FIG. 9 illustrates an exemplary embodiment in which the size of the polyhedron component changes during motion of the polyhedron component.

FIG. 9 illustrates an exemplary embodiment in which the size of the polyhedron component is changed during motion of the polyhedron component.

A user selects a polyhedron component whose size is to be reduced or enlarged and changes the size of the polyhedron component. For example, when a mouse is used as the input device, the size of the polyhedron component can be reduced or enlarged by selecting and dragging a vertex of the polyhedron component.

Figure 10:
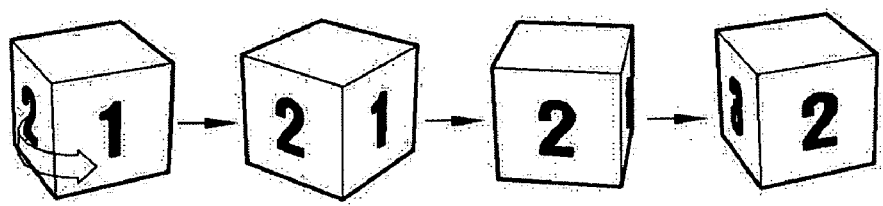
FIG. 10 illustrates an exemplary embodiment in which the polyhedron component rotates during its motion.

FIG. 10 illustrates an exemplary embodiment in which the polyhedron component rotates during its motion.

In FIG. 10, a hexahedron rotates to the right in the X-axis direction. However, the polyhedron component may rotate an arbitrary angle in the direction of an arbitrary axis as well as the X-axis, the Y-axis, or the Z-axis.

Figure 11:
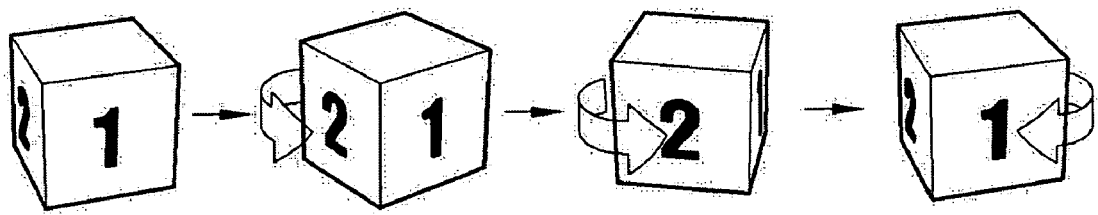
FIG. 11 illustrates an exemplary embodiment in which the polyhedron component is spring-locked during its motion.

FIG. 11 illustrates an exemplary embodiment in which the polyhedron component is spring-locked during its motion.

Spring lock means the polyhedron component rotates by a desired angle in a predetermined direction according to a user's action and returns to its original state if the user's action causing the rotation is released. In another exemplary embodiment, the polyhedron component may remain in a rotated state and then return to its original state upon a user's specific manipulation.

As described above, motion of the polyhedron component is generated by a user's direct action, but may also be generated by a change in the MGUI space (a change in division type of the MGUI space and a space reduction or enlargement) or movement in a camera view that is a viewpoint in the MGUI space.

Figure 12A:
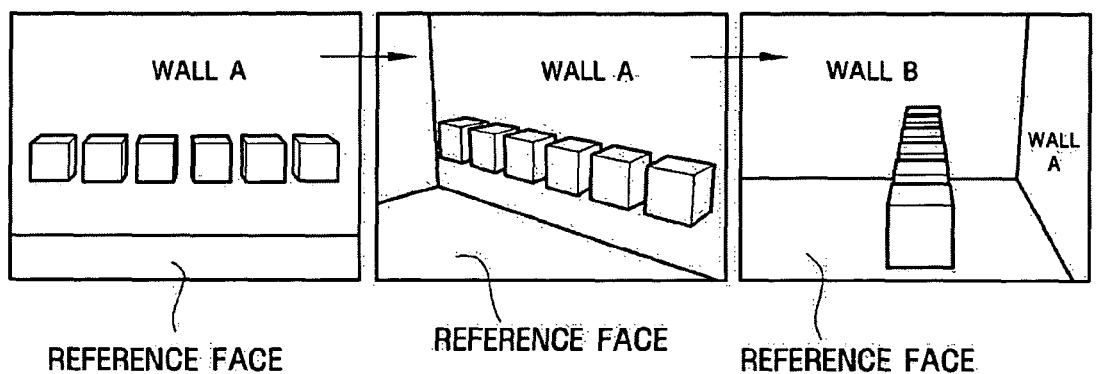
FIG. 12A illustrates an exemplary embodiment in which motion of the polyhedron component is generated according to changes in a camera view.

In FIG. 12A, as a camera view rotates to the left, all polyhedron components in the MGUI space rotate to the right. In addition, if the camera view is zoomed out, all polyhedron components in the MGUI space look reduced in size. If the camera view is zoomed in, all polyhedron components in the MGUI space look enlarged.

Figure 12B:
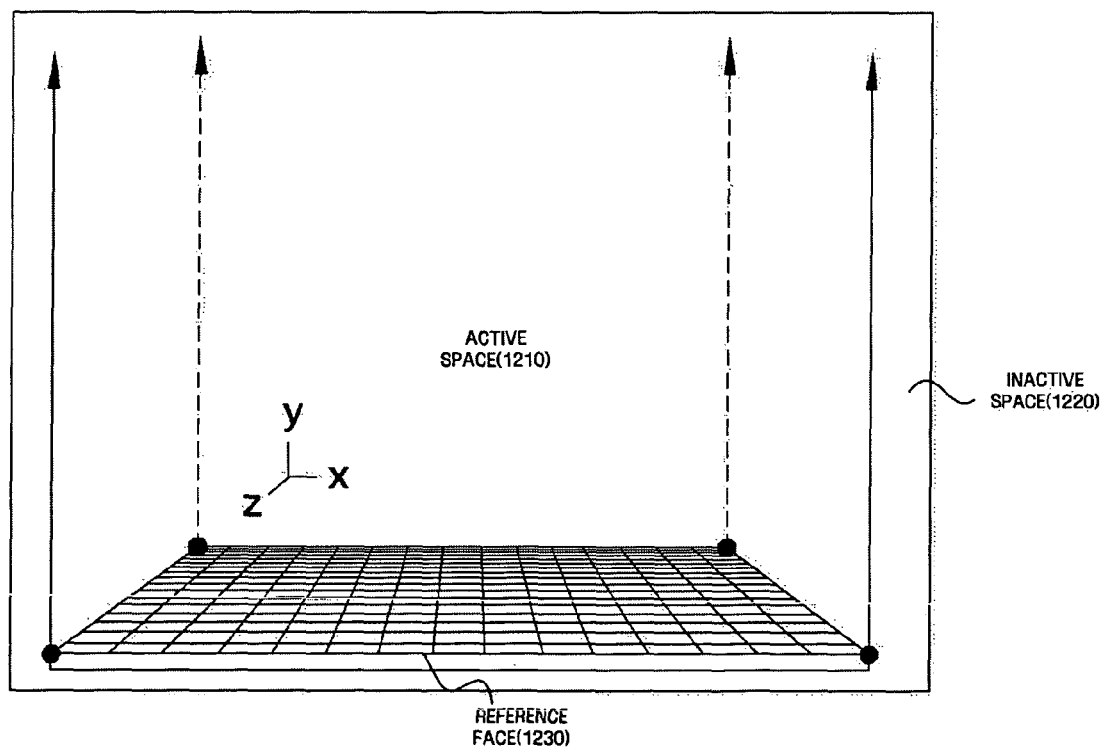
FIG. 12B shows a change in an MGUI space according to a division of the MGUI space into an active space and an inactive.

FIG. 12B shows a change in an MGUI space according to division of the MGUI space into an active space and an inactive space. As described with reference to FIG. 2, a polyhedron component may be located only in the active space of the MGUI space. Thus, since the position of the polyhedron component changes according to how the MGUI space is divided into the active space and the inactive space, the polyhedron component may look different to the user. In FIG. 12B, an active space 1210 is unlimited above a reference face 1230 along the Y-axis with limits along the X-axis and Z-axis. In other words, an area limited along the X-axis and Z-axis is defined as the reference face 1230 and the active space 1210 is unlimited above the reference face 1230 along the Y-axis. Thus, the polyhedron component can be located only in the active space 1210 inside a column defined with arrows and cannot be located in an inactive space 1220 outside the column and under the reference face 1230. In another exemplary embodiment, the MGUI space may be divided into a plurality of active spaces. In this case, presentation of groups of a plurality of polyhedron components may change according to how the MGUI space is divided into the plurality of active spaces.

The MGUI may include a plurality of polyhedron components. By managing a plurality of polyhedron components as a group, it is possible to give unity to presentation or movement in a UI and provide a user with a UI that is efficient for information search.

Figure 13:
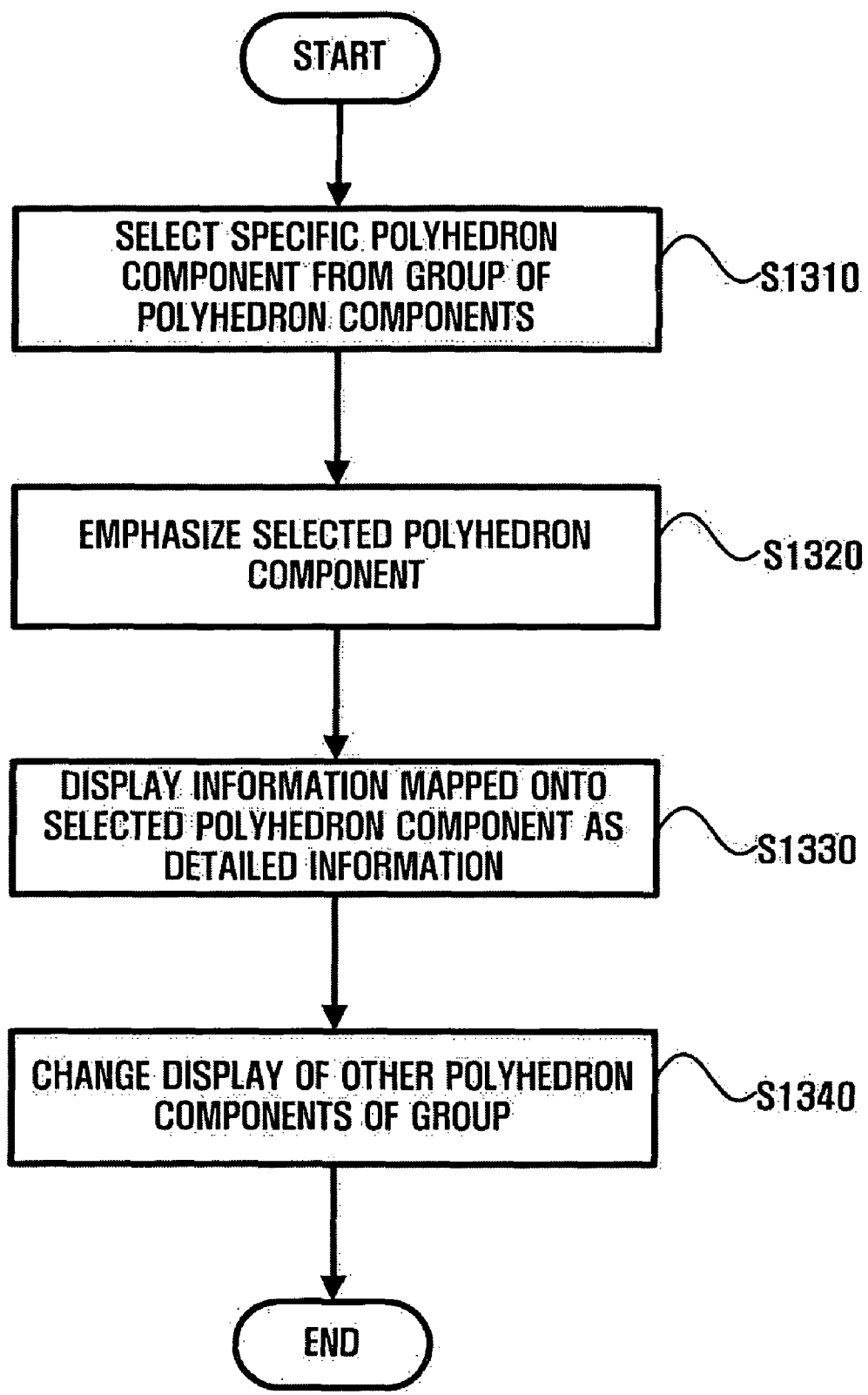
FIG. 13 is a flowchart illustrating a process of displaying information by a user interface using a plurality of polyhedron components.

FIG. 13 is a flowchart illustrating a process of displaying information by a UI using a plurality of polyhedron components.

If a user selects a specific polyhedron component from a group of polyhedron components in step S1310, the selected polyhedron component is emphasized in step S1320. Information mapped onto an information face of the selected polyhedron component may be displayed as detailed information in step S1330. The other polyhedron components from the group are displayed differently from the selected polyhedron component in step S1340.

User's selection of a specific polyhedron component from a group of polyhedron components (step S1310) can be made by accessing and selecting the specific polyhedron component using various input devices like a mouse, a keyboard, a keypad, and a touch pad. If the user selects a specific polyhedron component using various input devices, the input module 610 transfers information about user's selection to the component group managing module 626 of the user interface module 610 through the control module 630.

After completion of user's selection, the selected polyhedron component is emphasized in step S1320. Such an emphasis may be made by enlarging the selected polyhedron component or moving the selected polyhedron component close to the user in the Z-axis direction. In another exemplary embodiment, for the emphasis, the color of the selected polyhedron component may be changed or the edges of the selected polyhedron component may be marked with bold lines. In still another exemplary embodiment, the selected polyhedron component may be marked with a focus or other marks. If a specific polyhedron component is selected, an information face of the selected polyhedron component may display more detailed information than the information mapped by the component attribute assigning module 622, in step S1330. Alternatively, the selected polyhedron component can be emphasized by reducing the size of the other polyhedron components from the group, moving the other polyhedron components away from the user, or fading the colors of the other polyhedron components, and information continuity is represented in step S1340. Step S1340 is performed by the component group managing module 626 and the component attribute assigning module 622.

FIGS. 14 through 19 illustrate exemplary embodiments in which the group of polyhedron components described with reference to FIG. 13 is presented.

Figure 14:
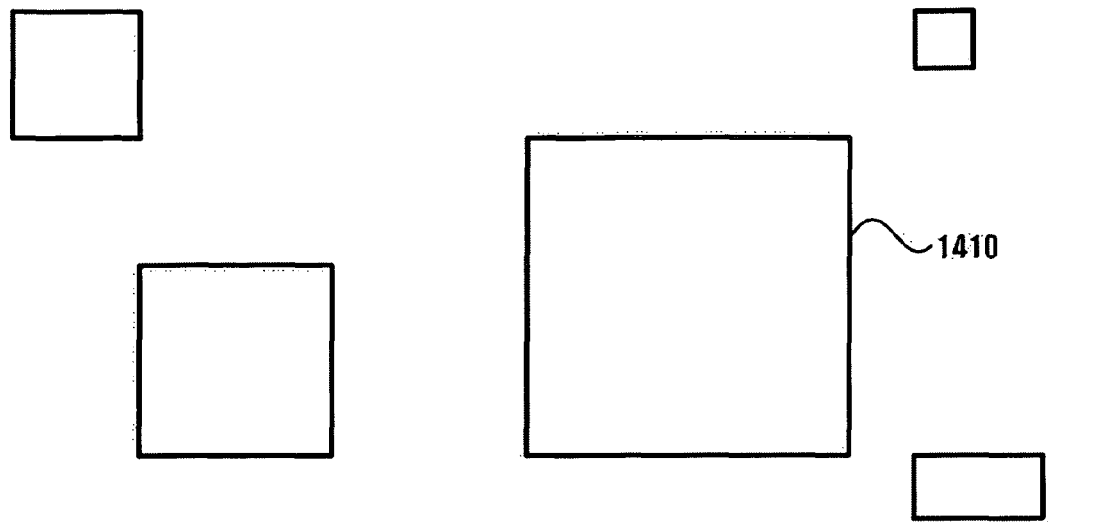
FIGS. 14 through 19 illustrate an exemplary embodiment in which groups of a plurality of polyhedron components are presented.

FIG. 14 shows presentation in which changes are made to the display sizes of the polyhedron components to allow a user to intuitively recognize information of importance or unimportance. In other words, information of a polyhedron component that is closer to the user in the Z-axis direction is more important, and information of the polyhedron component that is more away from the user in the Z-axis direction is less important. Thus, if a polyhedron component that is away from the user in the Z-axis direction is pulled forward, it can be enlarged. If a polyhedron component that is close to the user in the Z-axis direction is pushed backward, it can be reduced in size. At this time, as a selected polyhedron component 1410 is enlarged, neighboring polyhedron components that may collide with the enlarged polyhedron component are reduced in size. Also, a specific polyhedron component is selected, it can be enlarged. Selection of a polyhedron component can be made by moving a user's focus or horizontally or vertically moving components while fixing a user's focus.

Figure 15:
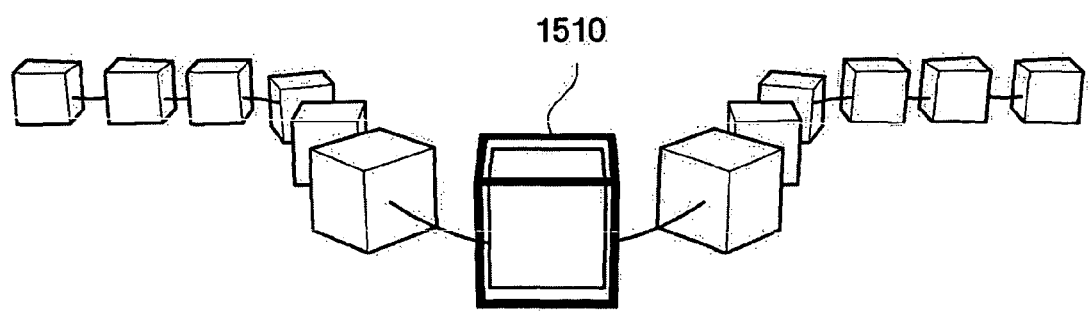

FIG. 15 shows presentation in which only a selected polyhedron component 1510 is enlarged and other polyhedron components are displayed gradually smaller for natural connection between information. In such presentation, a plurality of polyhedron components can be connected in the form of a curved line as shown in FIG. 15. In another exemplary embodiment, a plurality of polyhedron components can be connected in the form of a circle or a straight line. Selection of a polyhedron component can be made by moving a user's focus or horizontally or vertically moving components while fixing a user's focus.

Figure 16:
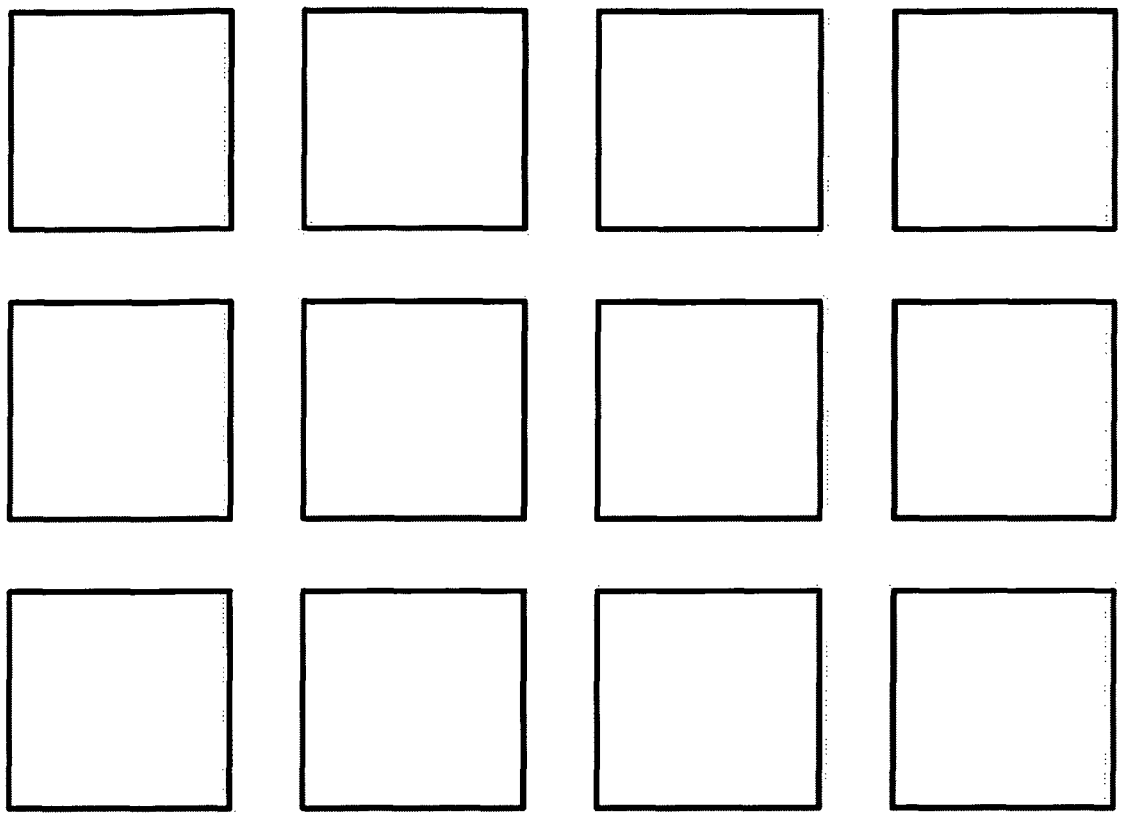

FIG. 16 shows presentation in which polyhedron components of the same size are arranged in the form of a lattice and a selected polyhedron component is enlarged to a full screen. Such presentation spreads information to briefly show a large amount of information. If a user selects a desired component for more detail information, the selected component is enlarged.

Figure 17:
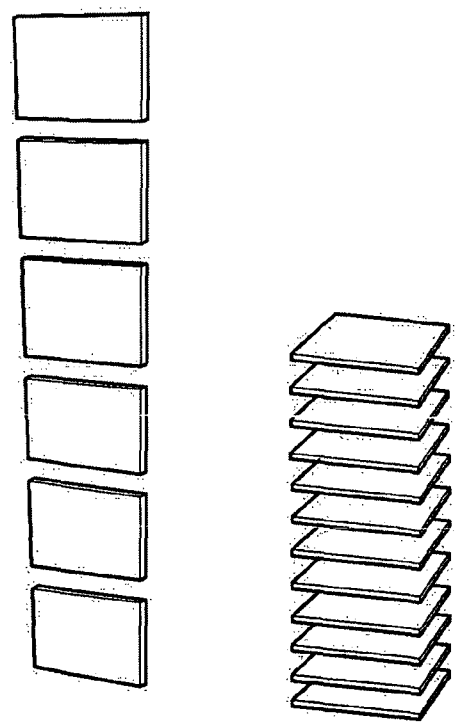

FIG. 17 shows a presentation in which various polyhedron components of the same size on which information is displayed are spread in a line or stacked one on top of the other. Thus, such a presentation as shown in FIG. 17 allows a user to coherently search for desired information by one-way viewing. If the user vertically moves polyhedron components using an input device and selects a specific component, a space is created above the selected polyhedron component to display more detail information. Selection of a component can be made by moving a user's focus or horizontally or vertically moving components while fixing a user's focus.

Figure 18:
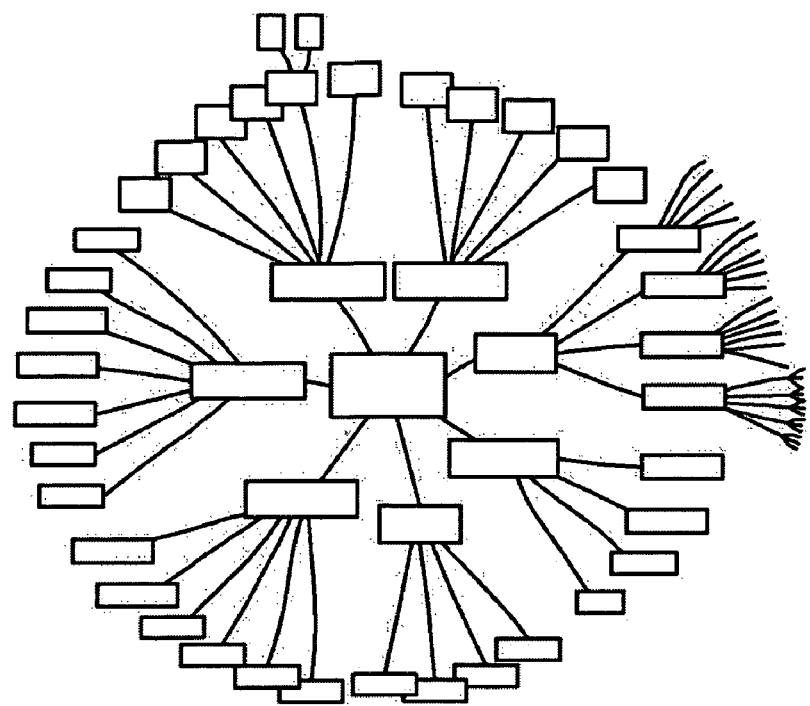

FIG. 18 shows presentation in which a plurality of polyhedron components are arranged in a radial form to allow a user to recognize a tree structure of information with a single glance. If the user selects a component on which information of interest is displayed, the selected component is enlarged and related information is displayed. At this time, neighboring components that are not selected are reduced in size or moved away from the user.

Figure 19:
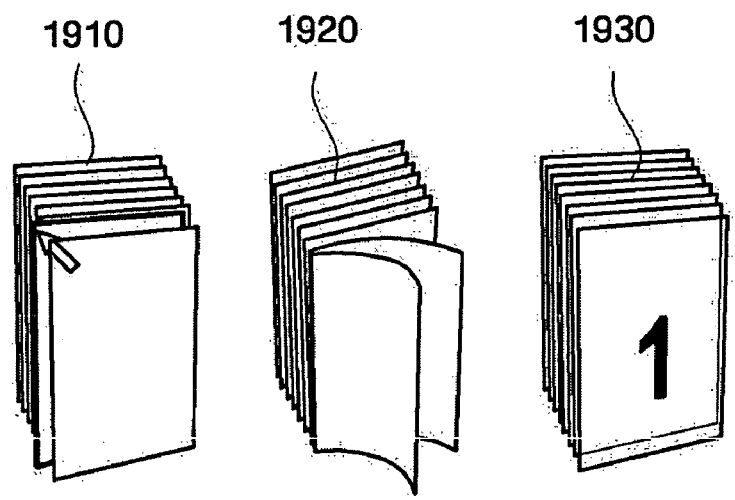

FIG. 19 shows presentation in which information faces displaying a large amount of information overlap one another. Thus, information of a currently selected component is positioned frontmost and other information of unimportance is positioned behind the selected component. Also, the user can take out one of overlapping information faces in the following manners.

First, an information face designated by the user is slid out (1910), and the direction of sliding and a time point and a position at which sliding is stopped can be set different when a UI is designed. Second, like when a page of a book is actually turned over, all the information faces in front of an information face designated by a user are flipped (1920) to show the designated information face. Third, all the information faces in front of the designated information face are displayed transparent (1930).

Figure 20:
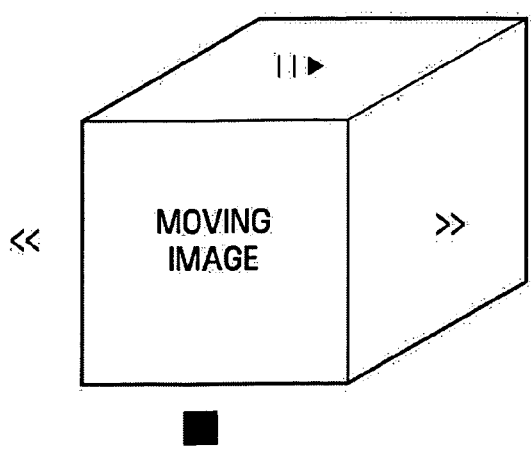
FIG. 20 illustrates a control panel of a media player using a polyhedron component.

FIG. 20 illustrates a control panel of a media player using a polyhedron component.

FIG. 20 shows a UI using a polyhedron component having the front information face onto which a moving image is mapped and capable of controlling a media player according to a user's action. In this exemplary embodiment, if the user spring-lock rotates the polyhedron component downwardly, the moving image is reproduced. Also, during reproduction, if the user spring-lock rotates the polyhedron component downwardly again, reproduction of the moving image is paused. In the pause state, by spring lock rotating the polyhedron component to the left or right, the user can move to a next or previous track of the moving image. If the user spring-lock rotates the polyhedron component upwardly, reproduction of the moving image is stopped.

Figure 21:
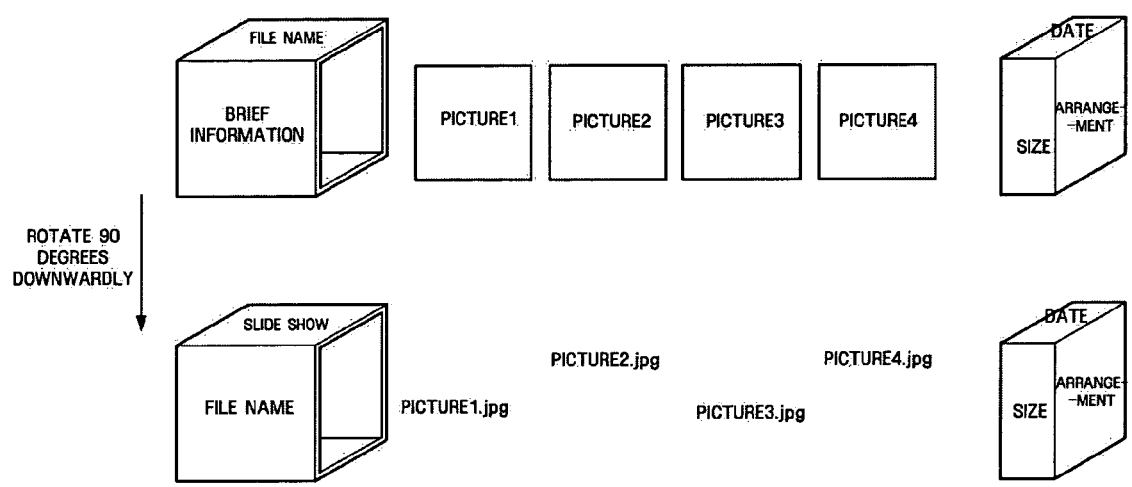
FIG. 21 illustrates information displayed using a polyhedron component having a cover.

FIG. 21 illustrates information displayed using a polyhedron component having a cover.

In this exemplary embodiment, presentation of information objects contained in the internal space of the polyhedron component having the cover varies with a face selected from faces of a main body and faces of the cover. In FIG. 21, since a "brief information" face is selected from the faces of the main body and a file size is selected as an arrangement criterion from the faces of the cover, brief information of the information objects contained in the internal space is presented on the basis of file sizes. At this time, if the user rotates the main body 90 degrees downwardly and selects a "file name" face, the information objects contained in the internal space are expressed with file names.

A providing information method and apparatus of the present invention may provide at least the following advantages.

First, information that is intuitive and satisfies a user's emotions is provided through a UI that uses three-dimensional components.

Second, by using motion of a polyhedron component or presenting groups of a plurality of components in various ways, a natural information flow is obtained and an error in a user's recognition is reduced.

Third, since users can view and control information from various angles, they can understand information more clearly.

Fourth, it is possible to display more information than conventional UIs by displaying information on faces of a polyhedron component.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for providing a three-dimensional motion graphic user interface (MGUI), wherein the apparatus comprises a storage medium storing modules, the modules comprising:

a control module which creates a three-dimensional interface space having an active space and an inactive space and creates a polyhedron component that is three-dimensionally presented in the active space;

a storage module which stores the three-dimensional interface space and the polyhedron component created by the control module;

an input module to which data about a user's action with respect to the three-dimensional interface space or the polyhedron component is input;

a user interface module which assigns predetermined attributes to at least one of a plurality of faces subject to the polyhedron component, maps information displayed to the faces of the at least one of a plurality of faces which are information faces according to the predetermined attributes, processes motion of the polyhedron component according to data about the user's action input through the input module, and changes the information which is mapped to at least one information face or the way of displaying the information which is mapped to at least one information face according to motion of the polyhedron component; and an output module which displays a processing result of the user interface module, wherein at least one of the faces with the predetermined attributes is separated from the polyhedron component and the information is displayed on the separated face.

2. The apparatus of claim 1, wherein the attributes include at least one of size of the polyhedron component, colors of the faces of the polyhedron component, transparency of the faces of the polyhedron component, information on whether a corresponding face is an information face, and colors of edges of the polyhedron component.

3. The apparatus of claim 1, wherein the information is displayed three-dimensionally.

4. The apparatus of claim 1, wherein the information is displayed differently according to a viewpoint with respect to the polyhedron component in the active space.

5. The apparatus of claim 1, wherein the position of the motion is changed according to a user's action.

6. The apparatus of claim 1, wherein the size of the motion is changed according to a user's action.

7. The apparatus of claim 1, wherein the motion rotates with respect to a plurality of axes according to a user's action.

8. The apparatus of claim 1, wherein the motion rotates with respect to a plurality of axes according to a user's action and then returns to its original state.

9. The apparatus of claim 1, wherein there are a plurality of polyhedron components which are formed in a group and the group is managed by the user interface module to display the polyhedron components and operate on the polyhedron components as units of the group.

10. The apparatus of claim 1, wherein all of the plurality of faces subject to the polyhedron component are unfolded into a plane.

11. The apparatus of claim 1, wherein at least one of the plurality of faces subject to the polyhedron component is closed or opened, and the polyhedron component contains at least one of information objects related to the information displayed on the plurality of faces subject to the polyhedron component.

12. The apparatus of claim 11, wherein the attributes include at least one of size of the polyhedron component, colors of the faces of the polyhedron component, transparency of the faces of the polyhedron component, information on whether a corresponding face is an information face, information on whether a corresponding face is closed or opened, the size of the face which is opened or closed, information about the information objects contained in the internal space, information about presentation and operation of the information objects contained in the internal space, and colors of edges of the polyhedron component.

13. The apparatus of claim 11, wherein the information objects that are contained in the internal space change according to information displayed on a face on which a focus is placed among the plurality of faces subject to the polyhedron component.

14. The apparatus of claim 1, wherein there are a plurality of polyhedron components which form a group and the user interface module manages the group.

15. The three-dimensional motion graphic user interface of claim 1, wherein the active space corresponds to a space within a first axis and a second axis and above a reference face along a third axis; and the inactive space corresponds to a space outside a region corresponding to the active space.

16. The three-dimensional motion graphic user interface of claim 1, wherein the active space comprises a plurality of active spaces.

17. The three-dimensional motion graphic user interface of claim 1, wherein the polyhedron component is one of a three dimensional figure having at least four faces and a sphere.

18. The three-dimensional motion graphic user interface of claim 1, further comprising:

an information face which is visualized as a single component, wherein the information displayed on the information face operates based on the polyhedron component.

19. The three-dimensional motion graphic user interface of claim 18, wherein when the information displayed on the face of the polyhedron component changes, the information displayed on the information face changes.

20. The three-dimensional motion graphic user interface of claim 18, wherein the information face is displayed on a two dimensional plane having no depth.

* * * * *